(12) United States Patent
Endo et al.

(10) Patent No.: US 11,329,588 B2
(45) Date of Patent: May 10, 2022

(54) POWER CONVERSION DEVICE, MOTOR MODULE, AND ELECTRIC POWER STEERING DEVICE

(71) Applicant: Nidec Corporation, Kyoto (JP)

(72) Inventors: Shuji Endo, Kyoto (JP); Kaori Nabeshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/961,262

(22) PCT Filed: Nov. 20, 2018

(86) PCT No.: PCT/JP2018/042844
§ 371 (c)(1),
(2) Date: Jul. 10, 2020

(87) PCT Pub. No.: WO2019/138698
PCT Pub. Date: Jul. 18, 2019

(65) Prior Publication Data
US 2021/0067080 A1    Mar. 4, 2021

(30) Foreign Application Priority Data
Jan. 10, 2018    (JP) .............................. JP2018-001946

(51) Int. Cl.
*H02P 29/028* (2016.01)
*H02P 25/22* (2006.01)
*B62D 5/04* (2006.01)
*H02P 27/08* (2006.01)

(52) U.S. Cl.
CPC .............. *H02P 25/22* (2013.01); *B62D 5/046* (2013.01); *H02P 27/085* (2013.01)

(58) Field of Classification Search
CPC .......... H02P 25/22; H02P 27/085; H02P 6/16; H02P 27/14; B62D 5/046
See application file for complete search history.

(56) References Cited

U.S. PATENT DOCUMENTS

| 2018/0175779 A1* | 6/2018 | Koseki ................. H02P 29/028 |
| 2018/0375457 A1 | 12/2018 | Kitamura et al. |
| 2019/0089287 A1* | 3/2019 | Wada ..................... H02M 1/32 |

(Continued)

FOREIGN PATENT DOCUMENTS

| JP | 63-158472 U | 10/1988 |
| JP | 2009-261223 A | 11/2009 |

OTHER PUBLICATIONS

Official Communication issued in International Patent Application No. PCT/JP2018/042844, dated Feb. 12, 2019.

*Primary Examiner* — Muhammad S Islam
(74) *Attorney, Agent, or Firm* — Keating & Bennett

(57) ABSTRACT

A power conversion device includes a first inverter, a second inverter, and a control circuit that performs Pulse Width Modulation (PWM) control of switching elements of the first and second inverters according to at least one switching scheme. For an H bridge of each phase, the control circuit performs PWM control according to at least one switching scheme that turns on a high-side switching element in one of a pair of legs and switches a low-side switching element in another of the pair of legs, or turns on a low-side switching element in one of the pair of legs and switches a high-side switching element in another of the pair of legs.

9 Claims, 13 Drawing Sheets

(56) References Cited

U.S. PATENT DOCUMENTS

2019/0315388 A1* 10/2019 Ohashi .................... H02M 7/48
2019/0393823 A1* 12/2019 Ghaderi ............... B62D 5/0463
2020/0251966 A1* 8/2020 Endo ....................... H02P 27/06

* cited by examiner

POWER CONVERSION DEVICE, MOTOR MODULE, AND ELECTRIC POWER STEERING DEVICE

CROSS REFERENCE TO RELATED APPLICATIONS

This is a U.S. national stage of PCT Application No. PCT/JP2018/042844, filed on Nov. 20, 2018, and claiming priority under 35 U.S.C. § 119(a) and 35 U.S.C. § 365(b) to Japanese Application No. 2018-001946, filed Jan. 10, 2018; the entire disclosures of each of which are hereby incorporated herein by reference.

FIELD OF THE INVENTION

The present disclosure relates to a power conversion device, a motor module, and an electric power steering device that each convert power from a power supply into power to be supplied to an electric motor.

BACKGROUND

In motor drive systems including voltage-type inverters, complementary pulse width modulation (PWM) control is generally adopted. The motor drive systems convert a direct current (DC) voltage to an alternating current (AC) voltage. The complementary PWM control is control for performing switching by applying control signals of opposite phases to two switching elements of legs connected in series, for example, field effect transistors (typically MOSFETs) to invert the mutual switching elements.

In the complementary PWM control, particularly, high-side and low-side FETs are turned on at the same time due to the delay of the turn-on/turn-off of the FETs that are the switching elements, and as a result, electronic components are likely to be damaged. In order to prevent this damage, it is necessary to insert a dead time. The dead time is the time when both the high-side and low-side FETs are turned off. In general, the MOSFET requires a dead time of a few μs.

There is known complementary PWM control that determines a carrier frequency of PWM and a time (reverse-phase time) to be controlled by reverse-phase PWM according to a duty ratio. A PWM control means performs the PWM control to fix the carrier frequency to a predetermined value (for example, 20 kHz) and change the reverse-phase time according to the duty ratio when a duty ratio command signal is less than a predetermined duty ratio. The PWM control means performs the PWM control to fix the reverse-phase time to a predetermined value (for example, 20 μs) and change the carrier frequency according to the duty ratio when the duty ratio command signal is equal to or more than the predetermined duty ratio. In particular, it is considered that the predetermined value of the reverse-phase time is preferably longer than the predetermined dead time.

In the complementary PWM control, there is a problem that a period in which it is difficult to apply a voltage in a carrier cycle is generated due to the insertion of the dead time so that the carrier cycle, that is, an effective utilization rate of the voltage, decreases.

SUMMARY

A power conversion device according to an example embodiment of the present disclosure is a power conversion device that converts power from a power supply into power to be supplied to a motor having n-phase (n is an integer of three or more) windings, and includes a first inverter which includes n legs connected to first ends of the n-phase windings of the motor, a second inverter which includes n legs connected to second ends of the n-phase windings of the motor, and a control circuit which performs Pulse Width Modulation (PWM) control of switching elements of the first and second inverters according to at least one switching scheme. The n-phase windings, the n-legs of the first inverter, and the n-legs of the second inverter define H bridges of the n phases, and each of the H bridges of the n phases includes a pair of legs. For the H bridges of the respective phases, the control circuit performs PWM control according to the at least one switching scheme that turns on a high-side switching element in one of the pair of legs and then switches a low-side switching element in the other leg or turns on a low-side switching element in one of the pair of legs and then switches a high-side switching element in the other leg.

The above and other elements, features, steps, characteristics and advantages of the present disclosure will become more apparent from the following detailed description of the example embodiments with reference to the attached drawings.

DETAILED DESCRIPTION

Hereinafter, power conversion devices, motor modules, and electric power steering devices according to example embodiments of the present disclosure will be described in detail with reference to the accompanying drawings. However, there is a case where a detailed description more than necessary is omitted in order to prevent the following description from being unnecessarily redundant and to facilitate understanding by those skilled in the art. For example, detailed descriptions of already well-known matters and repeated descriptions for substantially the same configuration are omitted in some cases.

In the present specification, example embodiments of the present disclosure will be described by taking, as an example, a power conversion device that converts power from a power supply into power to be supplied to a three-phase motor having three-phase (A-phase, B-phase, and C-phase) windings. However, a power conversion device that converts power from a power supply into power to be supplied to an n-phase motor having n-phase winding (n is an integer of four or more), such as four-phase windings and five-phase windings, is also within the scope of the present disclosure.

Figure 1:
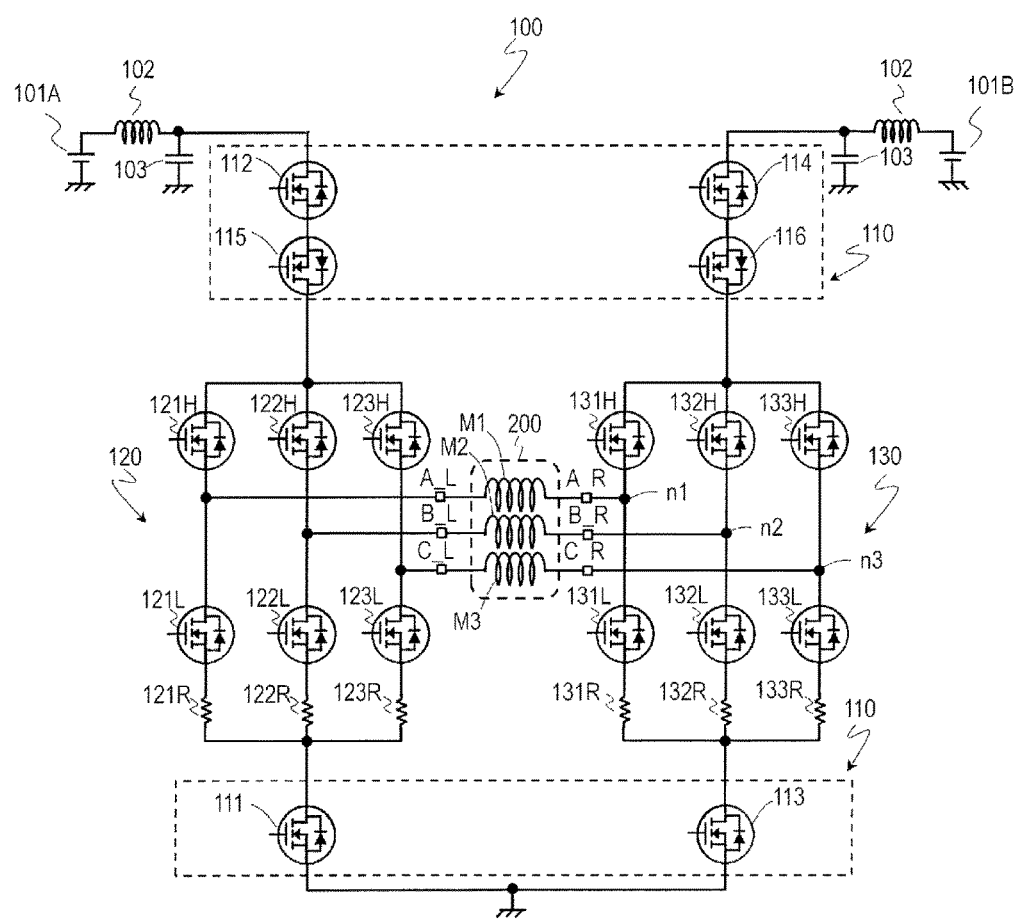
FIG. 1 is a circuit diagram illustrating a circuit configuration of an inverter unit 100 according to a first example embodiment of the present invention.

FIG. 1 schematically illustrates a circuit configuration of an inverter unit 100 according to the present example embodiment.

The inverter unit 100 includes a power cutoff circuit 110, a first inverter 120, and a second inverter 130. However, the inverter unit 100 does not necessarily include the power cutoff circuit 110. The inverter unit 100 can convert power from power supplies 101A and 101B into power to be supplied to the motor 200. For example, the first and second inverters 120 and 130 can convert DC power into three-phase AC power that is a pseudo sine wave of an A-phase, a B-phase, and a C-phase.

The motor 200 is, for example, a three-phase AC motor. The motor 200 includes an A-phase winding M1, a B-phase winding M2, and a C-phase winding M3, and is connected to the first inverter 120 and the second inverter 130. Specifically, the first inverter 120 is connected to one end of the winding of each phase of the motor 200, and the second inverter 130 is connected to the other end of the winding of each phase. In the present specification, "connection" between parts (components) mainly means electrical connection.

The first inverter 120 has terminals A_L, B_L, and C_L corresponding to the respective phases. The second inverter 130 has terminals A_R, B_R and C_R corresponding to the respective phases. The terminal A_L of the first inverter 120 is connected to one end of the A-phase winding M1, the terminal B_L is connected to one end of the B-phase winding M2, and the terminal C_L is connected to one end of the C-phase winding M3. Similarly to the first inverter 120, the terminal A_R of the second inverter 130 is connected to the other end of the A-phase winding M1, the terminal B_R is connected to the other end of the B-phase winding M2, and the terminal C_R is connected to the other end of C-phase winding M3. Such motor connection is different from so-called star connection and delta connection.

The power cutoff circuit 110 includes first to fourth switching elements 111, 112, 113, and 114. In the inverter unit 100, the first inverter 120 can be electrically connected to the power supply 101A and GND by the power cutoff circuit 110. The second inverter 130 can be electrically connected to the power supply 101B and the GND by the power cutoff circuit 110. Specifically, the first switching element 111 switches connection/disconnection between the first inverter 120 and the GND. The second switching element 112 switches connection/disconnection between the power supply 101A and the first inverter 120. The third switching element 113 switches connection/disconnection between the second inverter 130 and the GND. The fourth switching element 114 switches connection/disconnection between the power supply 101B and the second inverter 130.

On/off of the first to fourth switching elements 111, 112, 113, and 114 can be controlled by, for example, a microcontroller or a dedicated driver. The first to fourth switching elements 111, 112, 113, and 114 can cut off a bidirectional current. As the first to fourth switching elements 111, 112, 113 and 114, for example, a semiconductor switch such as a thyristor, an analog switch IC, and a field-effect transistor (typically, a MOSFET) having a parasitic diode formed therein, a mechanical relay, and the like can be used. A combination of a diode and an insulated gate bipolar transistor (IGBT) may be used. The drawings in the present specification illustrate the MOSFET as an example of the first to fourth switching elements 111, 112, 113, and 114. Hereinafter, the first to fourth switching elements 111, 112, 113, and 114 are referred to as SW 111, 112, 113, and 114, respectively, in some cases.

The SW 111 is arranged such that a forward current flows in an internal parasitic diode toward the first inverter 120. The SW 112 is arranged such that a forward current flows in a parasitic diode toward the power supply 101A. The SW 113 is arranged such that a forward current flows in a parasitic diode toward the second inverter 130. The SW 114 is arranged such that a forward current flows in a parasitic diode toward the power supply 101B.

As illustrated in the drawing, it is preferable that the power cutoff circuit 110 further include fifth and sixth switching elements 115 and 116 for reverse connection protection. The fifth and sixth switching elements 115 and 116 are typically MOSFET semiconductor switches having parasitic diodes. The fifth switching element 115 is connected in series to the SW 112, and is arranged such that a forward current flows in the parasitic diode toward the first inverter 120. The sixth switching element 116 is connected in series to the SW 114, and is arranged such that a forward current flows in the parasitic diode toward the second inverter 130. Even when the power supplies 101A and 101B are connected reversely, a reverse current can be cut off by the two switching elements for reverse connection protection.

The number of switching elements to be used is not limited to the illustrated example, and is appropriately determined in consideration of design specifications and the like. Particularly in the in-vehicle field, high quality assurance is required from the viewpoint of safety, and thus, it is preferable to provide a plurality of switching elements used for each inverter.

The power supply can include the power supply 101A for the first inverter 120 and the power supply 101B for the second inverter 130. The power supplies 101A and 101B generate a predetermined power supply voltage (for example, 12 V). As the power supply, for example, a DC power supply is used. However, the power supply may be an AC-DC converter and a DC-DC converter or may be a battery (storage battery). In addition, the power supply 101 may be a single power supply common to the first and second inverters 120 and 130.

A coil 102 is provided between the power supplies 101A and 101B and the power cutoff circuit 110. The coil 102 functions as a noise filter, and smooths high frequency noise included in a voltage waveform supplied to each inverter or high frequency noise generated by each inverter so as not to flow out to the power supply side.

A capacitor 103 is connected to a power supply terminal of each inverter. The capacitor 103 is a so-called bypass capacitor and suppresses a voltage ripple. The capacitor 103 is, for example, an electrolytic capacitor, and the capacitance and the number to be used are appropriately determined according to design specifications and the like.

The first inverter 120 includes a bridge circuit having three legs. Each leg has a low-side switching element and a high-side switching element. An A-phase leg has a low-side switching element 121L and a high-side switching element 121H. A B-phase leg has a low-side switching element 122L and a high-side switching element 122H. A C-phase leg has a low-side switching element 123L and a high-side switching element 123H. As the switching element, for example, a FET or an IGBT can be used. Hereinafter, an example in which a MOSFET is used as a switching element will be described, and the switching element is referred to as SW in some cases. For example, the low-side switching elements 121L, 122L, and 123L are referred to as SW 121L, 122L, and 123L, respectively.

The first inverter 120 includes three shunt resistors 121R, 122R, and 123R included in a current sensor 150 (see FIG. 3) configured to detect a current flowing in each phase winding of the A-phase, the B-phase, and the C-phase. The current sensor 150 includes a current detection circuit (not illustrated) that detects a current flowing in each shunt resistor. For example, each of the shunt resistors 121R, 122R, and 123R are connected between each of the three low-side switching elements included in the three legs of the first inverter 120 and the GND. Specifically, the shunt resistor 121R is electrically connected between the SW 121L and the SW 111, and the shunt resistor 122R is electrically connected between the SW 122L and the SW 111, and the shunt resistor 123R is electrically connected between the SW 123L and the SW 111. A resistance value of the shunt resistor is, for example, about 0.5 mΩ to 1.0 mΩ.

The second inverter 130 includes a bridge circuit having three legs, which is similar to the first inverter 120. An A-phase leg has a low-side switching element 131L and a high-side switching element 131H. A B-phase leg has a low-side switching element 132L and a high-side switching element 132H. A C-phase leg has a low-side switching element 133L and a high-side switching element 133H. In addition, the second inverter 130 includes three shunt resistors 131R, 132R, and 133R. Each of these shunt resistors is connected between each of the three low-side switching elements included in the three legs and the GND.

The number of shunt resistors is not limited to three for each inverter. For example, it is possible to use two shunt resistors for the A-phase and the B-phase, two shunt resistors for the B-phase and the C-phase, and two shunt resistors for the A-phase and the C-phase. The number of shunt resistors to be used and the arrangement of the shunt resistors are appropriately determined in consideration of product cost and design specifications.

As described above, the second inverter 130 has substantially the same structure as the structure of the first inverter 120. In FIG. 1, the left inverter on the paper surface is referred to as the first inverter 120, and the right inverter is referred to as the second inverter 130 for convenience of the description. However, such notation should not be construed with the intention of limiting the present disclosure. The first and second inverters 120 and 130 can be used without distinction as components of the inverter unit 100.

Figure 2:
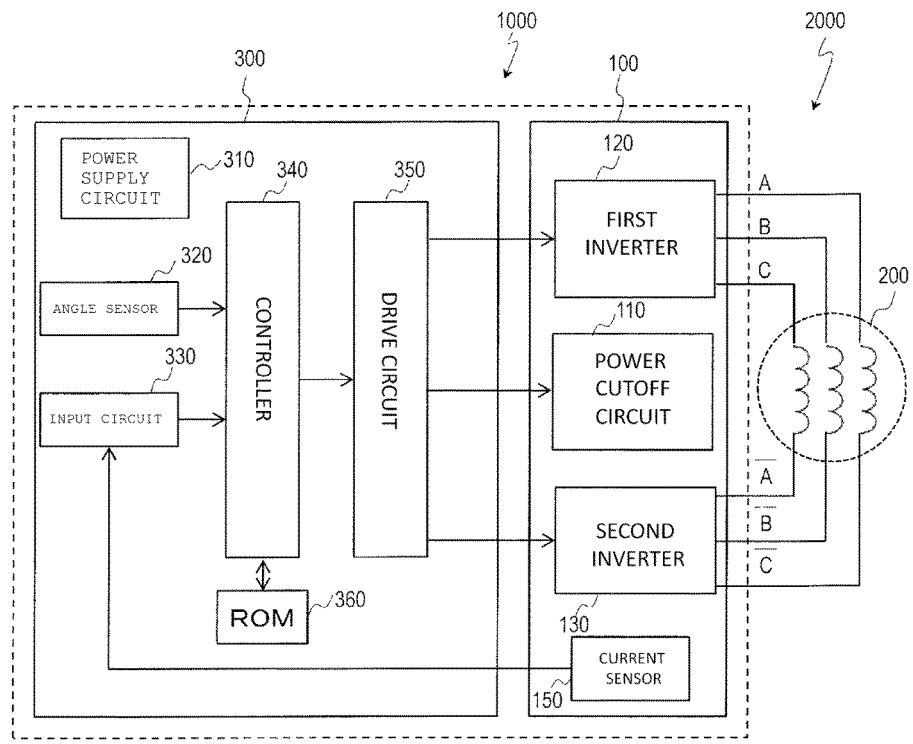
FIG. 2 is a block configuration diagram illustrating a block configuration of a motor module 2000 according to the first example embodiment, which mainly illustrates a block configuration of a power conversion device 1000.

FIG. 2 schematically illustrates a block configuration of a motor module 2000 according to the present example embodiment, which schematically illustrates a block configuration of a power conversion device 1000 mainly.

The motor module 2000 includes the power conversion device 1000 having the inverter unit 100 and a control circuit 300, and the motor 200.

The motor module 2000 is modularized and can be manufactured and sold as, for example, an electromechanically integrated motor having a motor, a sensor, a driver, and a controller. In addition, the power conversion device 1000 other than the motor 200 can be modularized and manufactured and sold.

The control circuit 300 includes, for example, a power supply circuit 310, an angle sensor 320, an input circuit 330, a controller 340, a drive circuit 350, and a ROM 360. The control circuit 300 is connected to the inverter unit 100 and drives the motor 200 by controlling the inverter unit 100.

Specifically, the control circuit 300 can realize closed loop control by controlling a position, a rotational speed, a current, and the like of a rotor of the target motor 200. Note that the control circuit 300 may include a torque sensor instead of the angle sensor 320. In this case, the control circuit 300 can control a target motor torque.

The power supply circuit 310 generates a DC voltage (for example, 3 V or 5 V) necessary for each block in the circuit.

The angle sensor 320 is, for example, a resolver or a Hall IC. Alternatively, the angle sensor 320 is also realized by a combination of an MR sensor having a magnetoresistive (MR) element and a sensor magnet. The angle sensor 320 detects a rotation angle of the rotor (hereinafter referred to as "rotation signal") and outputs the rotation signal to the controller 340.

The input circuit 330 receives a motor current value detected by the current sensor 150 (hereinafter, referred to as "actual current value"), converts a level of the actual current value into an input level of the controller 340 as necessary, and outputs the actual current value to the controller 340. The input circuit 330 is, for example, an analog/digital conversion circuit.

The controller 340 is an integrated circuit that controls the entire power conversion device 1000, and is, for example, a microcontroller or a field programmable gate array (FPGA). The controller 340 controls a switching operation (turning-on or turning-off) of each SW in the first and second inverters 120 and 130 of the inverter unit 100. The controller 340 sets a target current value according to the actual current value and the rotation signal of the rotor, generates a PWM signal, and outputs the PWM signal to the drive circuit 350. In addition, the controller 340 can control on/off of each SW in the power cutoff circuit 110 of the inverter unit 100.

The drive circuit 350 is typically a gate driver (or pre-driver). The drive circuit 350 generates a control signal (gate control signal) to control the switching operation of the MOSFET of each SW in the first and second inverters 120 and 130 according to the PWM signal, and gives the control signal to a gate of each SW. In addition, the drive circuit 350 can generate a control signal to control on/off of each SW in the power cutoff circuit 110 according to an instruction from the controller 340. There is a case where a gate driver is not necessarily required when a driving target is a motor that can be driven at a low voltage. In such a case, a function of the gate driver may be implemented in the controller 340.

The ROM 360 is electrically connected to the controller 340. The ROM 360 is, for example, a writable memory (for example, a PROM), a rewritable memory (for example, a flash memory), or a read-only memory. The ROM 360 stores a control program including a command group configured to cause the controller 340 to control the power conversion device 1000. For example, the control program is temporarily expanded in a RAM (not illustrated) at the time of booting.

The control circuit 300 turns on all the SWs 111, 112, 113, and 114 of the power cutoff circuit 110. As a result, the power supply 101A and the first inverter 120 are electrically connected, and the power supply 101B and the second inverter 130 are electrically connected. In addition, the first inverter 120 and the GND are electrically connected, and the second inverter 130 and the GND are electrically connected. It is assumed that the SWs 115 and 116 for reverse connection protection of the power cutoff circuit 110 are always turned on. In such a connection state, the control circuit 300 drives the motor 200 by energizing the windings M1, M2, and M3 using both the first and second inverters 120 and 130. In the present specification, energizing the three-phase winding is referred to as "three-phase energization control".

Figure 3:
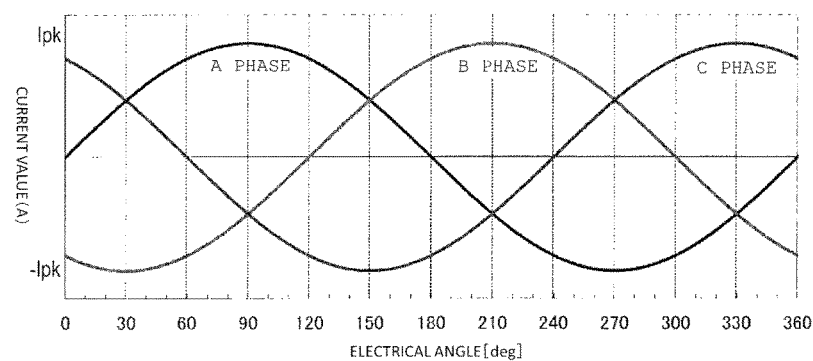
FIG. 3 is a graph illustrating a current waveform (sine wave) obtained by plotting current values flowing through A-phase, B-phase, and C-phase windings of a motor 200 according to an example embodiment of the present invention when the power conversion device 1000 is controlled according to three-phase energization control.

FIG. 3 illustrates a current waveform (sine wave) obtained by plotting current values flowing through the A-phase, B-phase, and C-phase windings of the motor 200 when the power conversion device 1000 is controlled according to the three-phase energization control. The horizontal axis indicates a motor electrical angle (deg), and the vertical axis indicates a current value (A). In the current waveform of FIG. 3, the current value is plotted every electrical angle of 30°. $I_{pk}$ represents the maximum current value (peak current value) of each phase.

In the current waveform illustrated in FIG. 3, the sum of currents flowing through the three-phase windings considering the direction of the current is "0" for each electrical angle. However, the currents flowing through the three-phase winding can be controlled independently according to a circuit configuration of the power conversion device 1000, and thus, it is also possible to perform control in which the total sum of currents does not become "0". For example, the control circuit 300 controls the switching operation of each switching element of the first and second inverters 120 and 130 by PWM control with which the current waveform illustrated in FIG. 3 can be obtained.

In general, the microcontroller modulates a duty (analog signal) as a modulation wave, with a PWM carrier as a carrier wave to output a complementary output signal of the complementary PWM control as a digital signal of a carrier frequency. A carrier frequency of an inverter when a MOSFET is used as the switching element is typically about 16 to 20 kHz.

As described above, insertion of a dead time is essential for the complementary PWM control as a countermeasure against damage to electronic components. However, the insertion of the dead time causes a period where it is difficult to apply a voltage in the carrier cycle, and thus, the carrier cycle, that is, the effective utilization rate of the voltage decreases. For example, when the dead time is set to 2 μs, the effective utilization rate of the voltage decreases by 4% for a carrier cycle of 50 μs.

The control circuit 300 according to the present example embodiment performs the PWM control of the respective switching elements of the first and second inverters 120 and 130 according to at least one switching scheme. The at least one switching scheme includes a first switching scheme and a second switching scheme which will be described below.

First, the first switching scheme will be described with reference to FIGS. 4A to 6.

FIGS. 4A to 4D schematically illustrate representative switching patterns and phase current flows of the first switching scheme. FIGS. 4A to 4D illustrate examples of a state of a phase current of the A phase flowing in an A-phase H bridge among the A phase, B phase, and C phase. B-phase and C-phase H bridges can be controlled along with the A-phase control to be described below.

The three-phase H bridges (full H bridge) are configured using the three-phase windings M1, M2, and M3, the three legs of the first inverter 120, and the three legs of the second inverter 130. Each of the three-phase H bridges has a pair of legs.

The first switching scheme is a scheme in which the control circuit 300 turns on a high-side switching element in one of the pair of legs and switches a low-side switching element in the other leg, or turns on a low-side switching element in one of the pair of legs and switches a high-side switching element in the other leg, for the H bridge of the respective phases.

More specifically, the first switching scheme is a scheme in which the control circuit 300 turns on the high-side switching element and turns off the low-side switching element in one of the pair of legs, turns off the high-side switching element in the other leg, and then, switches the low-side switching element in the other leg, or turns on the low-side switching element and turns off the high-side switching element in one of the pair of legs, turns off the low-side switching element in the other leg, and then, switches the high-side switching element in the other leg, for the H bridge of the respective phases.

Figure 4A:
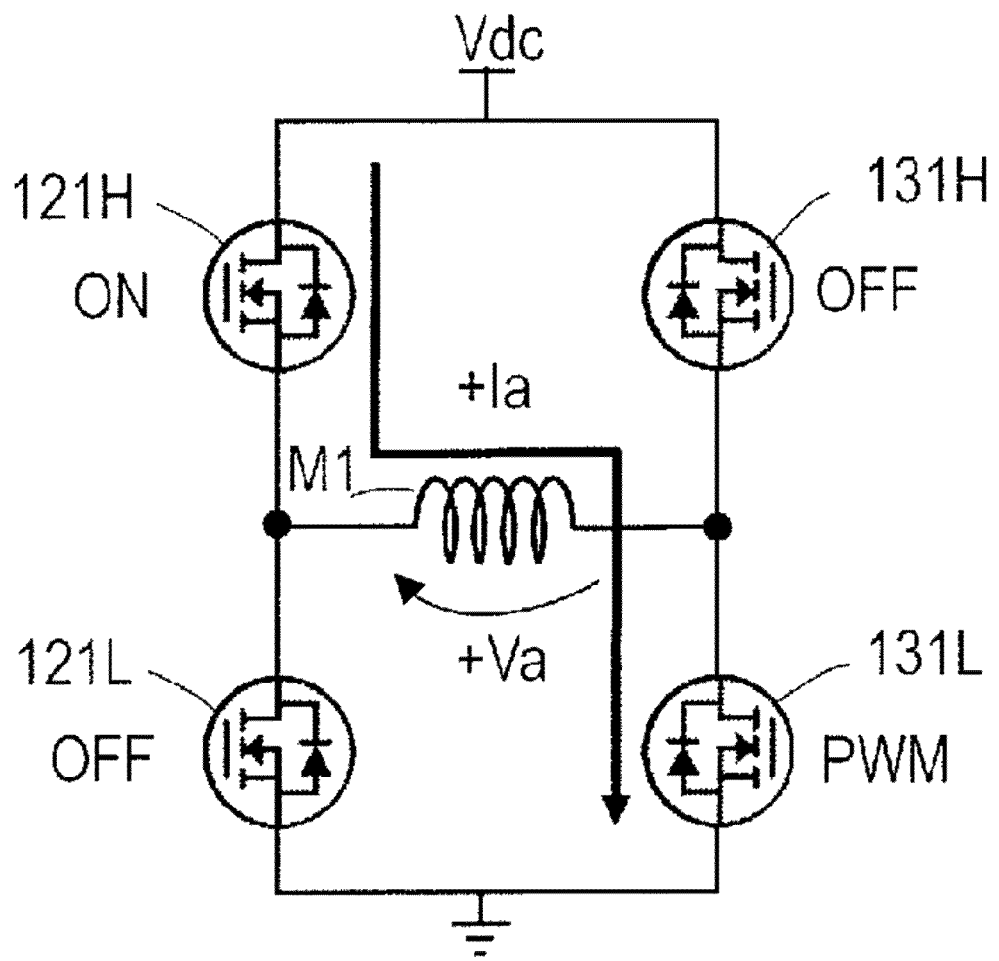
FIG. 4A is a schematic diagram illustrating representative switching pattern and phase current flow in a first switching scheme according to an example embodiment of the present invention.
Figure 4B:
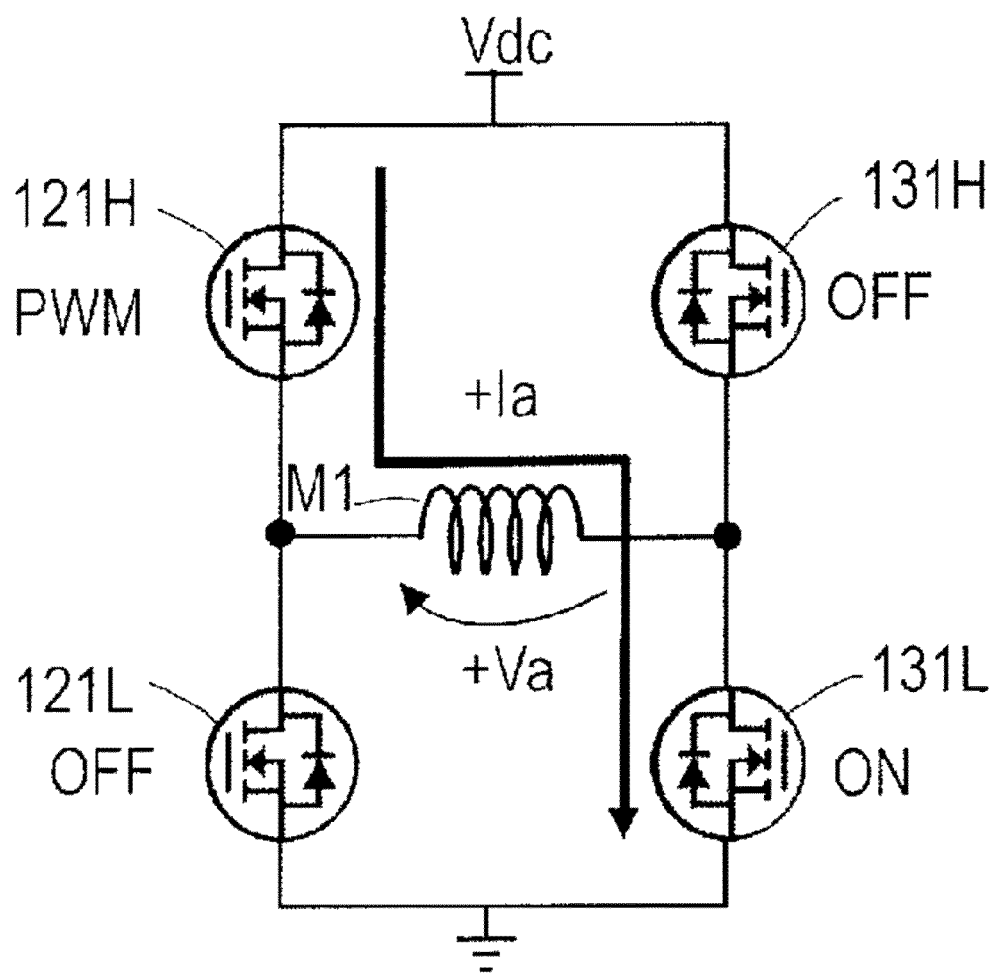
FIG. 4B is a schematic diagram illustrating representative switching pattern and phase current flow in the first switching scheme.

As illustrated in FIG. 4A, the control circuit 300 always turns off the SW 121L of the leg on the first inverter 120 side and the SW 131H of the leg on the second inverter 130 side. In this state, the control circuit 300 switches the SW 131L of the leg on the second inverter 130 side based on the PWM control with the SW 121H of the leg on the first inverter 120 side turned on. Alternatively, as illustrated in FIG. 4B, the control circuit 300 may switch the SW 121H of the leg on the first inverter 120 side based on the PWM control with the SW 131L of the leg on the second inverter 130 side turned on. With these kinds of control, a phase current Ia flows from the first inverter 120 through the winding 1 to the second inverter 130. A phase current flowing in this direction is referred to as a "positive current", and a phase voltage in a state where a potential of a terminal of the winding M1 on the first inverter 120 side is higher than that of a terminal on the second inverter 130 side is referred to as a "positive voltage".

Figure 4C:
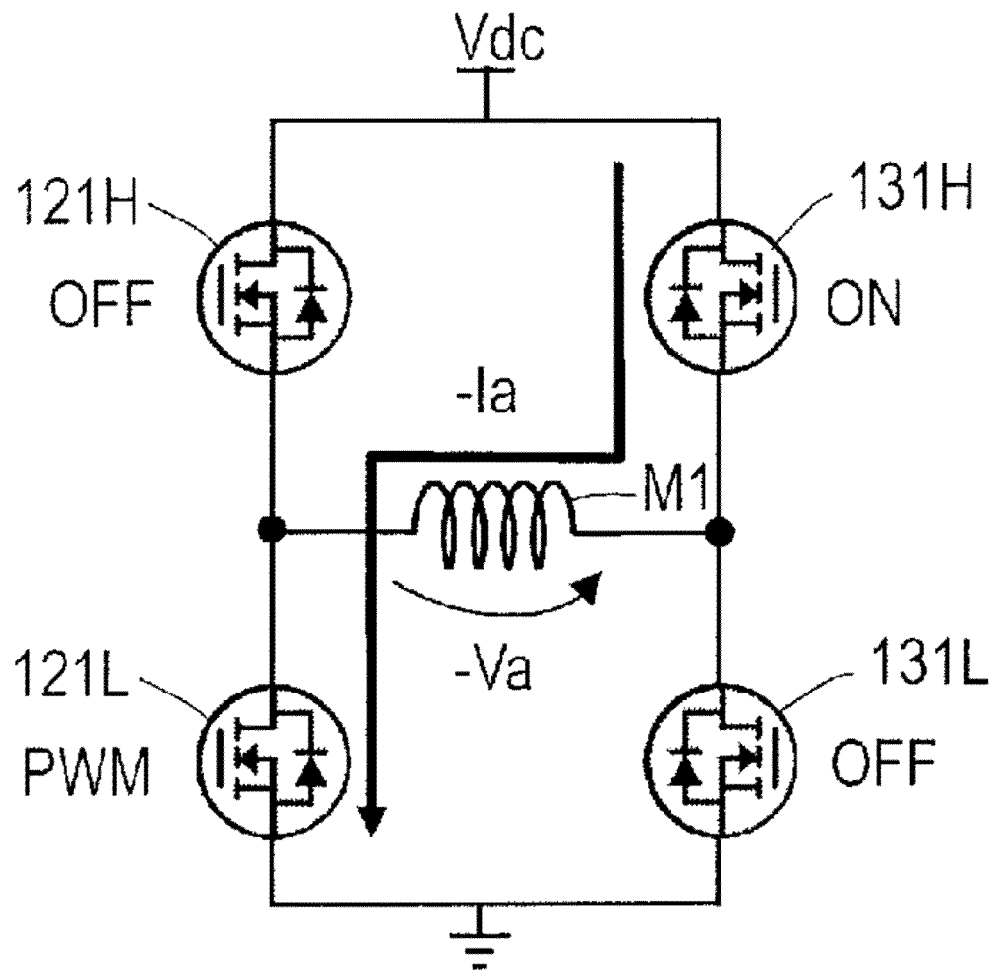
FIG. 4C is a schematic diagram illustrating representative switching pattern and phase current flow in the first switching scheme.
Figure 4D:
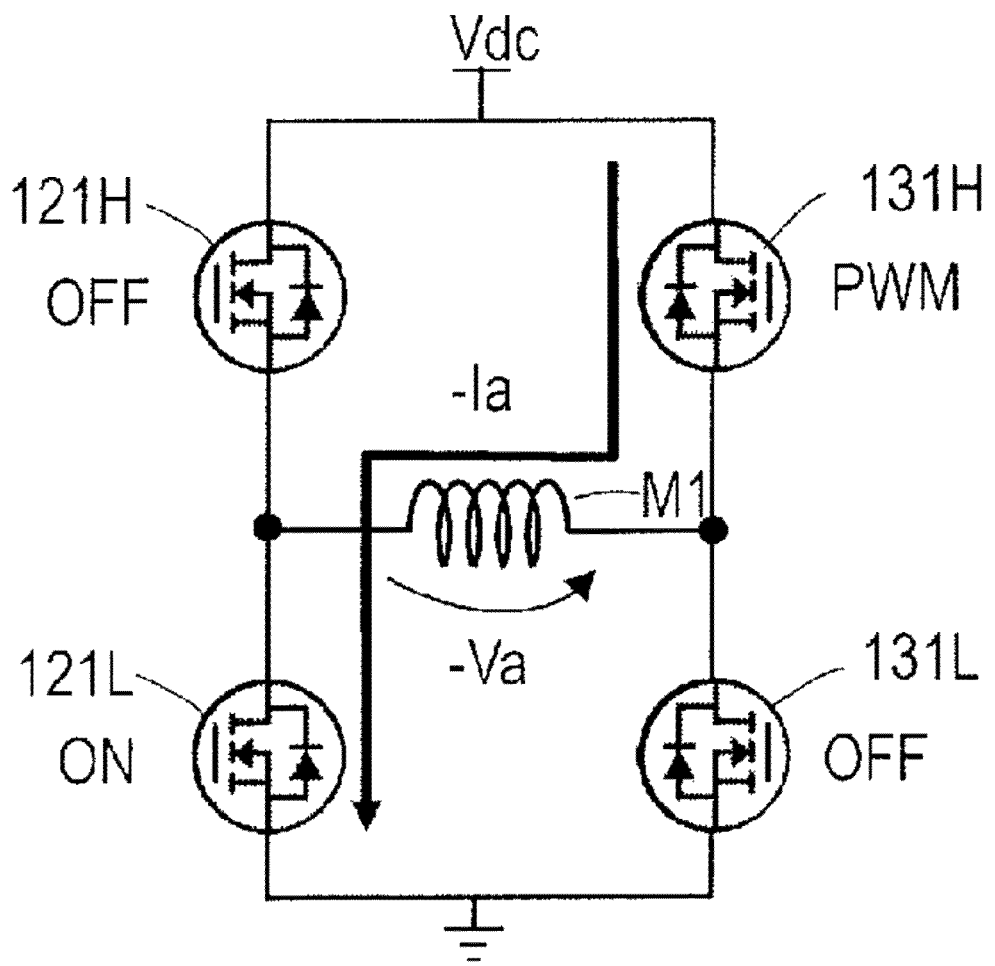
FIG. 4D is a schematic diagram illustrating representative switching pattern and phase current flow in the first switching scheme.

As illustrated in FIG. 4C, the control circuit 300 always turns off the SW 121H of the leg on the first inverter 120 side and the SW 131L of the leg on the second inverter 130 side. In this state, the control circuit 300 switches the SW 121L of the leg on the first inverter 120 side based on the PWM control with the SW 131H of the leg on the second inverter 130 side turned on. Alternatively, as illustrated in FIG. 4D, the control circuit 300 may switch the SW 131H of the leg on the second inverter 130 side based on the PWM control with the SW 121L of the leg on the first inverter 120 side turned on. With these kinds of control, a phase current Ia flows from the second inverter 130 through the winding 1 to the first inverter 120. A phase current flowing in this direction is referred to as a "negative current", and a phase voltage in a state where a potential of a terminal of the winding M1 on the first inverter 120 side is lower than that of a terminal on the second inverter 130 side is referred to as a "negative voltage".

According to the first switching scheme, the PWM control can be performed without inserting the dead time. This is because the high-side switching element or the low-side switching element included in one of the pair of legs of the H bridge is always turned off, and similarly, the high-side switching element or the low-side switching element included in the other leg is always turned off. In other words, this is because one pair of switching elements out of two pairs of switching elements diagonally arranged in the H bridge is always turned off.

Figure 5:
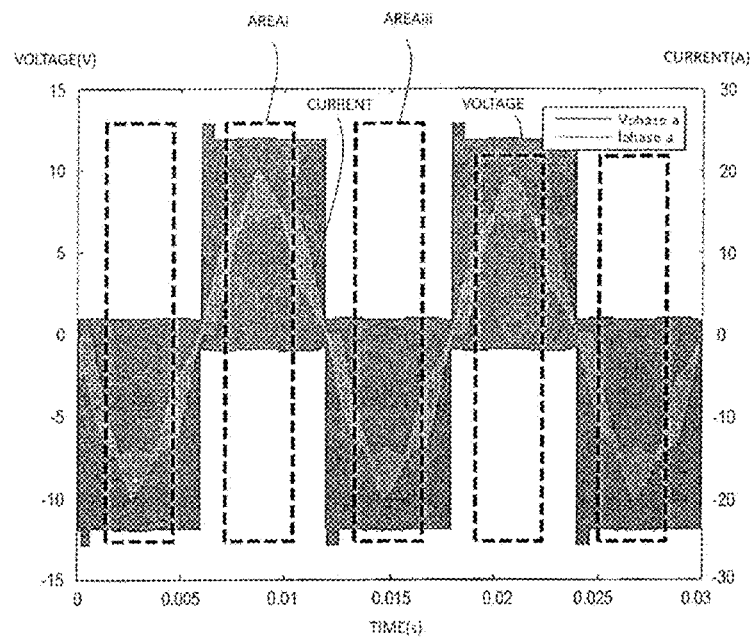
FIG. 5 is a graph illustrating examples of a voltage waveform and a phase current waveform when PWM control is performed according to the first switching scheme.
Figure 6:
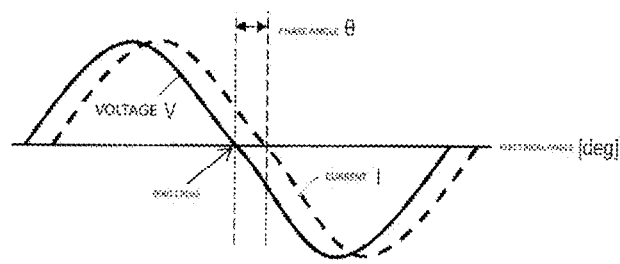
FIG. 6 is a schematic diagram describing a phase relationship between a phase current I and a phase voltage V.

FIG. 5 illustrates a PWM modulation wave (voltage waveform) and a phase current waveform of the A phase when the PWM control is performed according to the first switching scheme. The horizontal axis indicates time [s], the vertical axis on the right side of the graph indicates a current [A], and the vertical axis on the left side indicates a voltage [V]. FIG. 6 schematically illustrates a phase relationship between a phase current I and a phase voltage V.

As illustrated in FIG. 6, the phase current I is delayed by a phase angle θ relative to the phase voltage V. The phase angle θ is obtained by a resistance component and an inductance component. The phase current waveform represents a current simulation waveform, and the phase voltage waveform represents a voltage simulation waveform. An electrical angle or a time when a voltage command value becomes 0 V is referred to as "zero cross". A period in which both directions of the phase voltage and the phase current do not match is generated near the zero cross, more specifically, immediately after exceeding the zero cross. In other words, a period in which both directions of the voltage command value and a current command value do not match is generated. Hereinafter, such a period is referred to as a "mismatch period".

If only the first switching scheme is adopted, the phase voltage becomes indefinite during the mismatch period. As a result, it becomes difficult to appropriately apply a reverse voltage, specifically, to appropriately switch the application voltage from the positive direction to the negative direction or from the negative direction to the positive direction, so that there is a problem that it is difficult to appropriately ensure a current circuit. Therefore, the control circuit 300 according to the present example embodiment switches the switching scheme from the first switching scheme to the second switching scheme that performs switching based on complementary PWM control near the zero cross. As a result, it is possible to eliminate the indefiniteness of the phase voltage. In the present specification, the PWM control performed according to the first and second switching schemes is referred to as "hybrid PWM control".

The second switching scheme is a scheme in which the control circuit 300 switches a high-side switching element and a low-side switching element in each of a pair of legs based on the complementary PWM control, for the H bridges of the respective phases.

Figure 7:
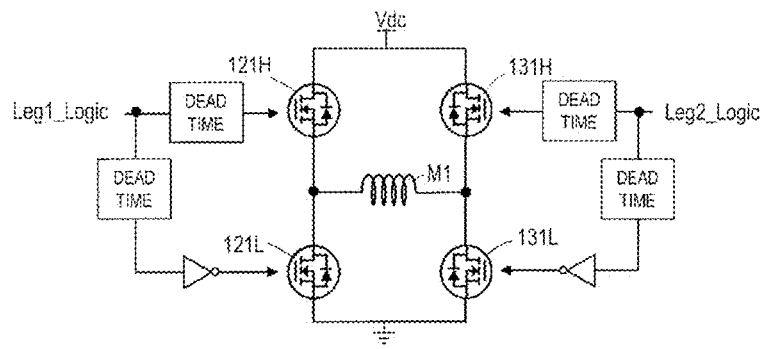
FIG. 7 is a schematic diagram illustrating a logic circuit generating a switching pattern based on PWM control according to an example embodiment of the present invention.

FIG. 7 is a schematic diagram illustrating a logic for generating a switching pattern based on the PWM control. A control signal Leg1_Logic is applied to the leg including the high switching element 121H and the low-side switching element 121L of the A-phase H bridge, and a control signal Leg2_Logic is applied to the leg including the high switching element 131H and the low-side switching element 131L. The inverter applies control signals of different polarities to the two switching elements of the leg. The B-phase and the C-phase H bridges are also controlled in the same manner as the A-phase H bridge.

Figure 8:
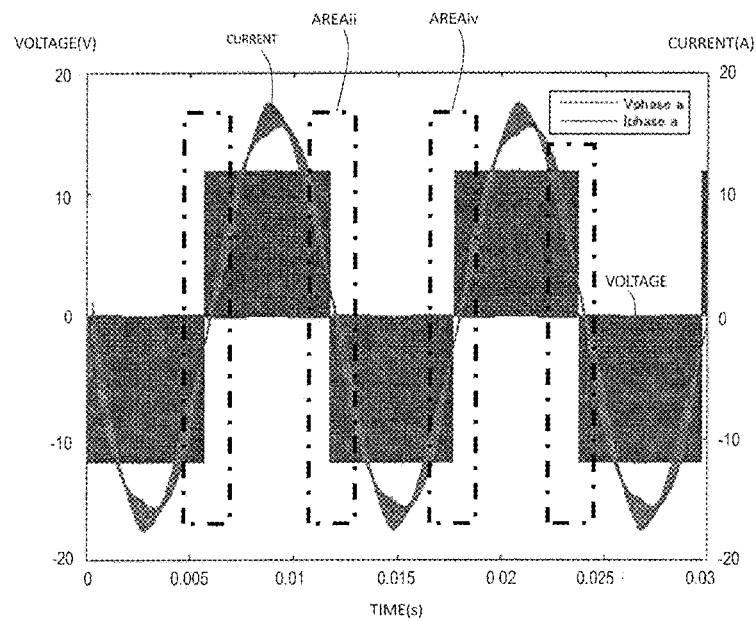
FIG. 8 is a graph illustrating examples of a voltage waveform and a phase current waveform when PWM control is performed according to a second switching scheme according to an example embodiment of the present invention.

FIG. 8 illustrates a PWM modulation wave (voltage waveform) and a phase current waveform of the A phase when the PWM control is performed according to the second switching scheme. The horizontal axis indicates time [s], the vertical axis on the right side of the graph indicates a current [A], and the vertical axis on the left side indicates a voltage [V].

The control circuit 300 performs the PWM control according to the second switching scheme near the time when the voltage command value becomes zero, that is, during a period near the zero cross (rectangular areas in FIG. 8), and performs the PWM control according to the first switching scheme during periods other than the above period (rectangular areas in FIG. 5). Hereinafter, the period near the zero cross is referred to as a "zero-cross period".

The zero-cross period may be a period before and after the time when the voltage command value becomes zero, or a period after the time, that is, the mismatch period. In this manner, the zero-cross period includes the above-described mismatch period. A width of the mismatch period changes according to a rotation speed of the motor or the like. Therefore, a width of the zero-cross period also changes according to the rotation speed of the motor.

Hereinafter, the hybrid PWM control will be described in detail with reference to FIGS. 5, 8, and 9A to 9D.

FIGS. 9A to 9D schematically illustrate representative switching patterns and phase current flows of the hybrid PWM control.

Figure 9:
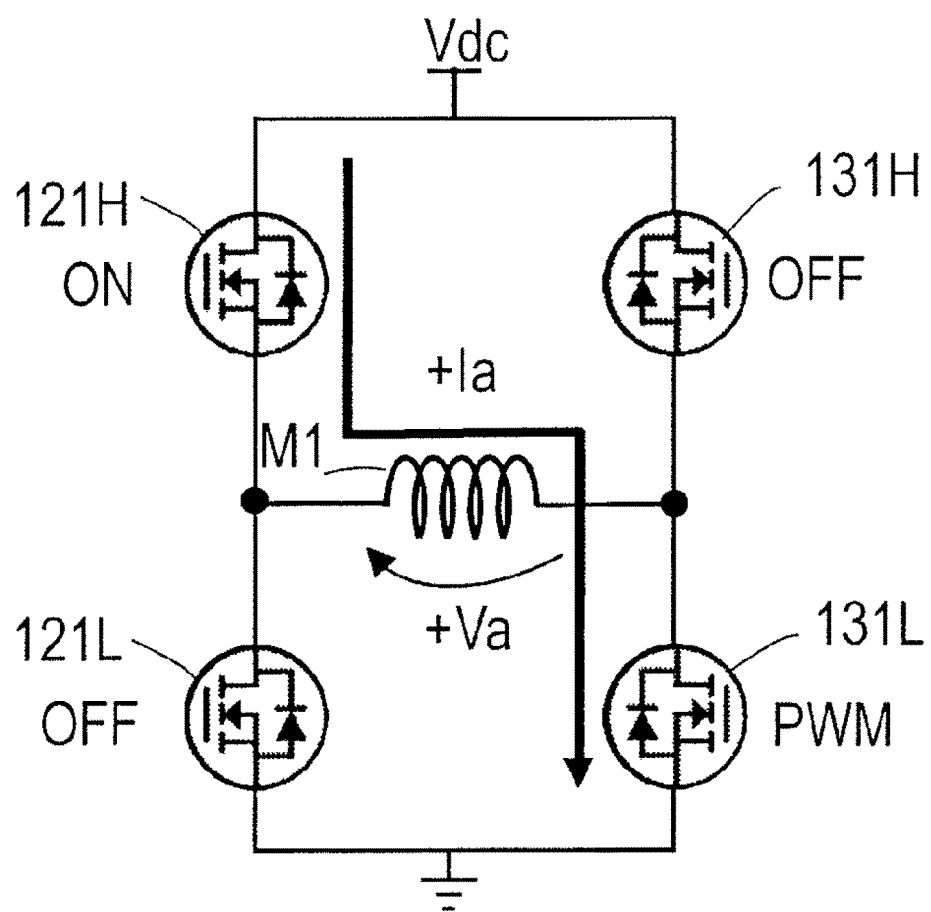
FIG. 9A is a schematic diagram illustrating representative switching pattern and phase current flow of hybrid PWM control according to an example embodiment of the present invention.
FIG. 9B is a schematic diagram illustrating a representative switching pattern and phase current flow of the hybrid PWM control according to an example embodiment of the present invention.
FIG. 9C is a schematic diagram illustrating representative switching pattern and phase current flow of the hybrid PWM control.
FIG. 9D is a schematic diagram illustrating representative switching pattern and phase current flow of the hybrid PWM control.

FIG. 9A illustrates a switching pattern in which a positive voltage is applied to cause a positive current to flow according to the first switching scheme. For example, the control circuit 300 always turns off the SWs 121L and 131H. In this state, the control circuit 300 switches the SW 131L based on the PWM control with the SW 121H turned on. A rectangular area i illustrated in FIG. 5 corresponds to a period in which this control is performed.

Figure 9B:
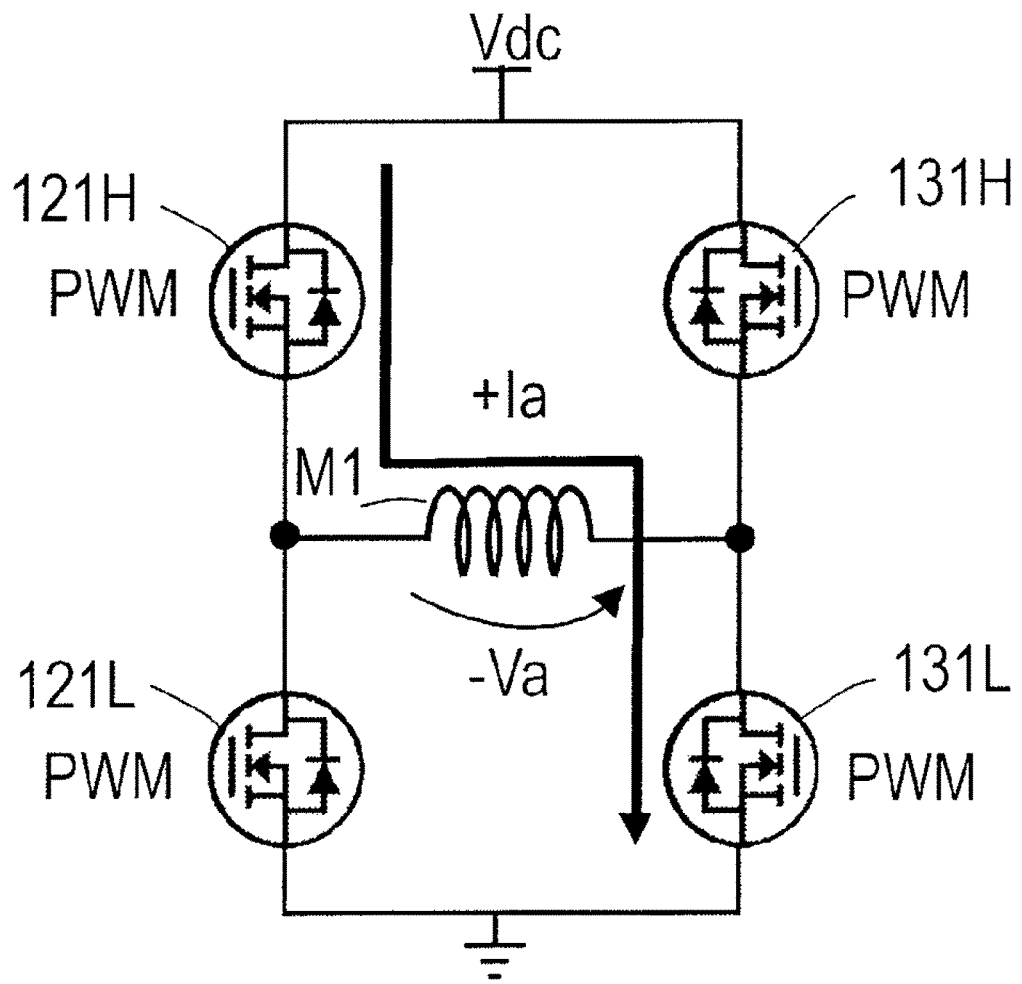
Figure 9:
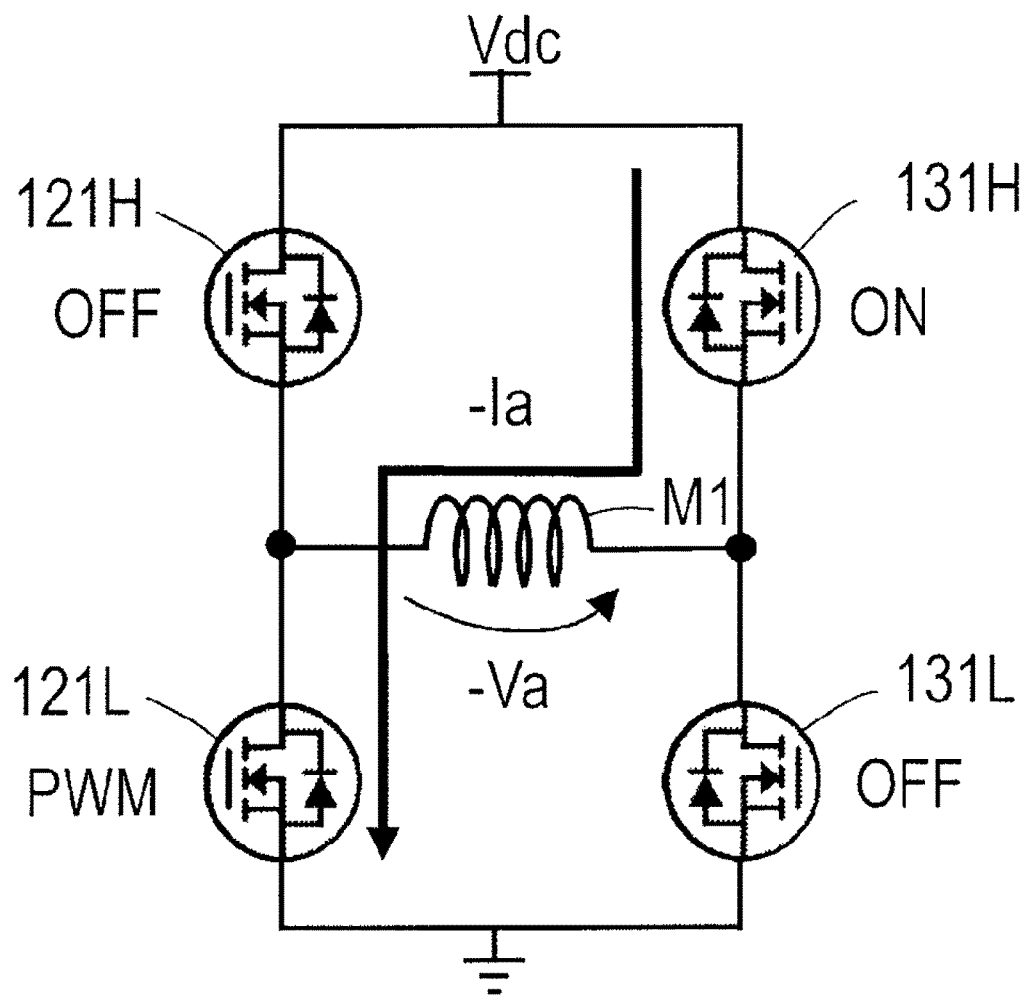

FIG. 9B illustrates a switching pattern in which a negative voltage is applied to cause a positive current to flow according to the second switching scheme. The control circuit 300 switches the SWs 121L, 121H, 131L, and 131H based on the complementary PWM control. A rectangular area ii illustrated in FIG. 8 corresponds to a period in which this control is performed. The rectangular area ii includes a mismatch period in which the current is the positive direction and the voltage is the negative direction.

FIG. 9C illustrates a switching pattern in which a negative voltage is applied to cause a negative current to flow according to the first switching scheme. The control circuit

300 always turns off the SWs 121H and 131L. In this state, the control circuit 300 switches the SW 121L based on the PWM control with the SW 131H turned on. A rectangular area iii illustrated in FIG. 5 corresponds to a period in which this control is performed.

Figure 9D:
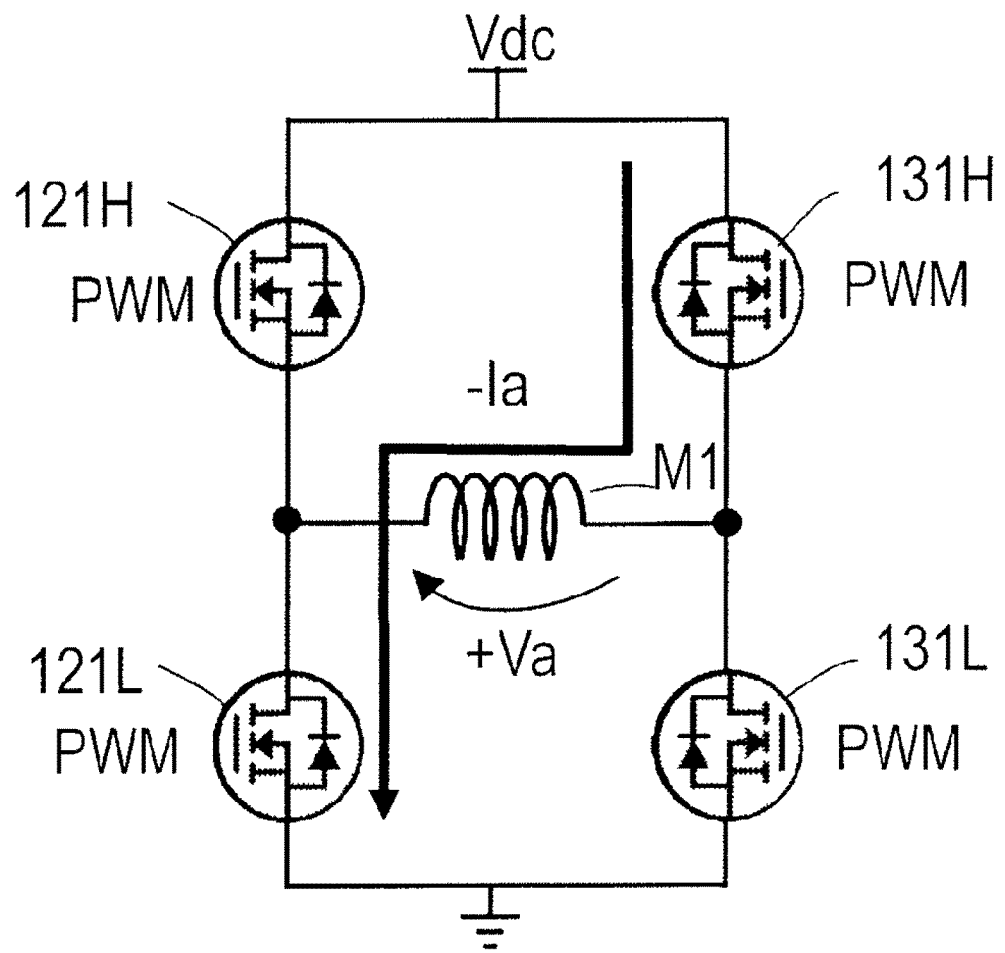

FIG. 9D illustrates a switching pattern in which a positive voltage is applied to cause a negative current to flow according to the second switching scheme. The control circuit 300 switches the SWs 121L, 121H, 131L, and 131H based on the complementary PWM control. A rectangular area iv illustrated in FIG. 8 corresponds to a period in which this control is performed. The rectangular region iv includes a mismatch period in which the current is the negative direction and the voltage is the positive direction.

In this manner, the control circuit 300 performs the hybrid PWM control using the rectangular areas i, ii, iii, and iv illustrated in FIGS. 5 and 8. According to the hybrid PWM control, it is possible to increase the effective utilization rate of the voltage in the carrier cycle, so that it is possible to realize a high output of the inverter.

Figure 10:
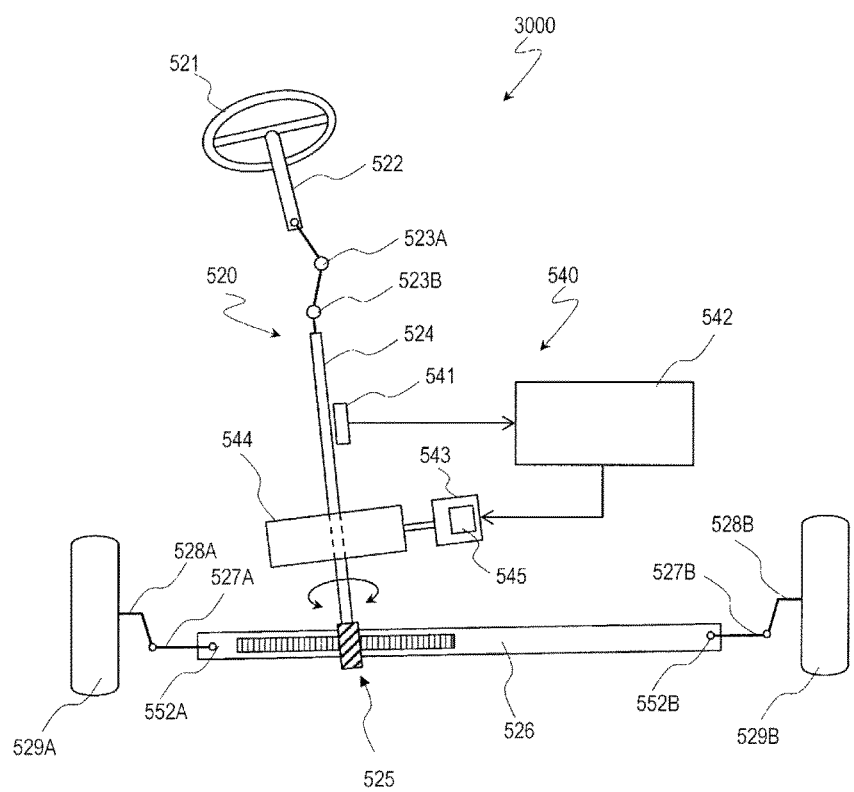
FIG. 10 is a schematic diagram illustrating a typical configuration of an electric power steering device 3000 according to a second example embodiment of the present invention.

FIG. 10 schematically illustrates a typical configuration of an electric power steering device 3000 according to the present example embodiment.

A vehicle such as an automobile generally has an electric power steering device. The electric power steering device 3000 according to the present example embodiment includes a steering system 520 and an auxiliary torque mechanism 540 that generates an auxiliary torque. The electric power steering device 3000 generates the auxiliary torque which assists a steering torque of the steering system that is generated when a driver operates the steering wheel. The operational burden of the driver is reduced by the auxiliary torque.

The steering system 520 includes, for example, a steering handle 521, a steering shaft 522, universal shaft joints 523A and 523B, a rotating shaft 524, a rack and pinion mechanism 525, a rack shaft 526, left and right ball joints 552A and 552B, tie rods 527A and 527B, knuckles 528A and 528B, and left and right steering wheels 529A and 529B.

The auxiliary torque mechanism 540 includes, for example, a steering torque sensor 541, an automotive electronic control unit (ECU) 542, a motor 543, and a speed reduction mechanism 544. The steering torque sensor 541 detects the steering torque in the steering system 520. The ECU 542 generates a drive signal based on a detection signal of the steering torque sensor 541. The motor 543 generates the auxiliary torque corresponding to the steering torque based on the drive signal. The motor 543 transmits the generated auxiliary torque to the steering system 520 via the speed reduction mechanism 544.

The ECU 542 includes, for example, the controller 340 and the drive circuit 350 according to the first example embodiment. In an automobile, an electronic control system using the ECU as the core is constructed. In the electric power steering device 3000, for example, a motor drive unit is constructed by the ECU 542, the motor 543, and the inverter 545. The motor module 2000 according to the first example embodiment can be suitably used for the unit.

Example embodiments of the present disclosure can be widely used in various devices including various motors such as a vacuum cleaner, a dryer, a ceiling fan, a washing machine, a refrigerator, and an electric power steering device.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device that converts power from a power supply into power to be supplied to a motor having n-phase windings, where n is an integer of three or more, the power conversion device comprising:
   a first inverter which includes n legs connected to first ends of the respective phase windings of the motor;
   a second inverter which includes n legs connected to second ends of the respective phase windings of the motor; and
   a control circuit which performs Pulse Width Modulation (PWM) control of switching elements of the first and second inverters according to at least one switching scheme; wherein
   the n-phase windings, the n-legs of the first inverter, and the n-legs of the second inverter define H bridges of the n phases, and each of the H bridges of the n phases includes a pair of legs; and
   for the H bridges of the respective phases, the control circuit performs PWM control according to the at least one switching scheme that:
      turns on a high-side switching element and turns off a low-side switching element in one of the pair of legs, turns off a high-side switching element in an other one of the pair of legs, and then, switches a low-side switching element in the other one of the pair of legs; or
      turns on the low-side switching element and turns off the high-side switching element in the one of the pair of legs, turns off the low side switching element in the other one of the pair of legs, and then, switches the high-side switching element in the other one of the pair of legs.

2. The power conversion device according to claim 1, wherein the at least one switching scheme further includes a second switching scheme to switch the high-side switching element and the low-side switching element in each of the pairs of legs based on complementary PWM control.

3. The power conversion device according to claim 1, further comprising:
   a first switching element that switches connection/disconnection between the first inverter and ground;
   a second switching element that switches connection/disconnection between the first inverter and the power supply;
   a third switching element that switches connection/disconnection between the second inverter and the ground; and
   a fourth switching element that switches connection/disconnection between the second inverter and the power supply.

4. A motor module comprising:
   a motor; and
   the power conversion device according to claim 1.

5. The power conversion device according to claim 2, wherein the control circuit switches the at least one switching scheme from the first switching scheme to the second switching scheme near a time when a voltage command value becomes zero.

6. The power conversion device according to claim 2, wherein the control circuit performs PWM control according to the second switching scheme in a zero-cross period near a time when a voltage command value becomes zero and performs PWM control according to the first switching scheme in periods other than the zero-cross period.

7. An electric power steering device comprising the motor module according to claim 4.

8. The power conversion device according to claim 6, wherein the zero-cross period includes a period in which both directions of the voltage command value and a current command value do not match.

9. The power conversion device according to claim 6, wherein a width of the zero-cross period changes according to a rotation speed of the motor.

* * * * *